H. GUYER.
CONNECTIONS FOR LEAD PIPES.

No. 182,435.  Patented Sept. 19, 1876.

Witnesses:
Geo. A. Thompson
Chet J. Selkirk

Hugh Guyer
his Atty
Alex. Selkirk
Inventor.

UNITED STATES PATENT OFFICE.

HUGH GUYER, OF ALBANY, ASSIGNOR TO HIMSELF AND SAMUEL BAKER, OF ALBANY, AND JOHN H. REYNOLDS, OF TROY, NEW YORK.

IMPROVEMENT IN CONNECTIONS FOR LEAD PIPES.

Specification forming part of Letters Patent No. 182,435, dated September 19, 1876; application filed January 31, 1876.

*To all whom it may concern:*

Be it known that I, HUGH GUYER, of the city and county of Albany, State of New York, have invented an Improved Coupling for Lead Pipe; and I do hereby declare that the following is a description thereof, reference being had to the accompanying drawings, forming a part of this specification, in which—

Figure 1:
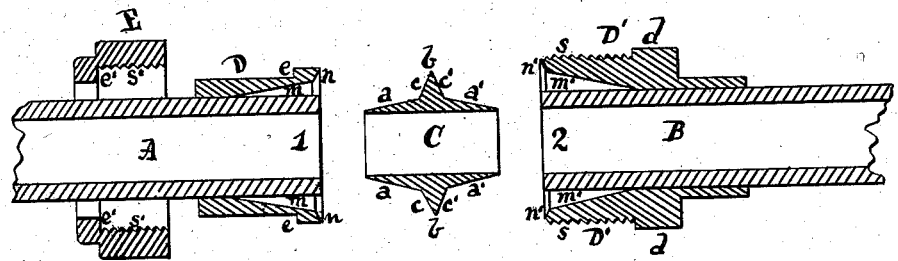
Figure 2:
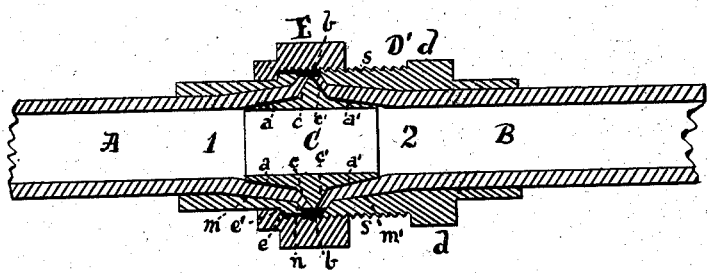

Figure 1 represents a longitudinal sectional view of the several parts of this invention when disconnected and the pipes in position preparatory to their connection being made. Fig. 2 is a longitudinal sectional view of the same, illustrating the pipes connected.

My invention relates to a coupling for lead pipes; and consists in the several devices and their combinations, hereinafter described, the object of this invention being to form a lap-joint connection of the pipes, which will be secure and water-tight without the aid of solder.

To enable others skilled in the art to make and use my invention, I will proceed to describe it in reference to the drawings and the letters of reference marked thereon, the same letters indicating like parts.

In the drawings, A and B represent each the end of two pieces of pipe to be connected. C is the connecting-bush, made of iron, brass, or other metal of a harder nature than the lead of the pipe, and comprised by the tapering inner swaging parts *a* and *a'*, and an annular central dividing portion, *b*, having the beveled surfaces *c* and *c'* rising up from the said tapering parts with an obtuse angle with the same, and all solid with each other, as shown. D is a sleeve, made of iron or other suitable metal harder than the lead of the pipe, provided with the shoulder *e*, and made with a tapering inner bore, *m*, having the diameter of its end toward the end of the pipe A greatest, and gradually contracting as it recedes toward the opposite end until about equal to the outer diameter of the bore of said pipe, as shown. The end of the said collar is made with the annular bevel *n* sloping inward toward said tapering bore. D' is a second sleeve, having a tapering bore, *m'*, and annular bevel end *n'*, made substantially as those made with the sleeve D. A portion of the outer periphery of sleeve D' is provided with a screw-thread, *s*, and also a suitable holding-piece, *d*, capable of engaging with a wrench or equivalent tool or instrument for holding the sleeve. E is a screw-collar, made with the inner screw-thread *s'* and shouldered collar *e'*, having a diameter sufficiently large to slip over the body of the sleeve D to the shoulder *e* of said sleeve, to permit the screw-thread bore to engage with the screw-thread *s* of the sleeve D'. The outer surface of the screw-collar is made with a flatened or equivalent form for engagement with a wrench or equivalent instrument for convenience in screwing the said collar to the sleeve D'.

When pipes A and B are to be coupled by the improvements in this invention, the ends 1 and 2 are to be inserted in their respective sleeves to about on a line with the ends of the same, when the walls of the ends of the said ends may be slightly set outward by means of a tapering pin. The connecting-bush is then placed in position by the tapering end *a* being inserted in the end 1 of pipe A, and the tapering end *a'* inserted in end 2 of pipe B, the said tapering ends entering in said tubes about one-half of their length. The screw-collar E is then slipped over the sleeve D until the shoulder *e'* is brought to bear against the shoulder *e* of said sleeve, or permits the screw-thread *s'* of said collar to engage with the screw-thread *s* of sleeve D'. The sleeve D' is then held from turning on its pipe B, and the screw-collar E is turned in a proper direction to carry it over the sleeve D, when the said sleeves D and D' will be drawn toward each other, and each toward the central bush C, while the tapering portions of said bush will be forced into the ends 1 and 2 of the bores of the pipes, and spread the same laterally to fill against the inner tapering bores *m m'* of sleeves D D', while the incline surfaces *c c'* of the central bush C will operate against the soft metal of the ends of said pipes to give the same a second lateral annular set-off against the beveled surfaces *n n'* of the sleeves D D'.

It will be observed that in no case are the sleeves D D' turned on the outer surface of the pipes to be connected, and that the screw-collar, when revolved, turns in contact with the sleeve D, while in lead-pipe couplings heretofore employed the one or more of the sleeves were revolved on the pipe, which prevented a formation of a tight joint. It will also be observed that in this invention the central or connecting bushes are made solid with each other and an annular projecting surface, against which the ends of the pipes to be connected are drawn, while in those couplings heretofore employing inner thimbles, the said thimbles were distinct and separate pieces, intended to butt one against the other when tightened by the screw-collar employed, and the juncture was only made water-tight by such contact as would render the two thimbles close-fitting.

It is therefore seen that as the connecting-bush C forms a substantial continuity of the bore of one pipe with the other, and the tapering ends of said bush form substantial lap-joints with the portion of said pipes receiving said tapering parts, the connection may be rendered perfectly water-tight.

It may also be observed that as the incline surfaces $c\ c'$ of the bush presses the metal of the ends of the pipes into the beveled ends of the sleeves, the metal, being soft, may be made to flow back and cause a perfect and compressed filling of all the space between the tapering surfaces $a\ a'$ of the bush and the surfaces $m\ m'$ of the sleeves.

The great advantage to be secured by this coupling is the perfectly tight joint with great strength, and the ready uniting of the pipes without disturbing either the inner or outer surfaces of the pipe by a circular abrasion of the metal of said pipes.

This coupling may be modified in its parts, so as to include a bush of greater longitudinal extension between the incline surfaces $c\ c'$, and may be made to receive a branch pipe, if desired, by making with said bush a branch extension at any angle with the same, with inclined inner swaging-piece to enter the bore of a branch pipe, and an incline similar to $c$ or $c'$, for operation with a sleeve having a form substantially as sleeve D, and a screw-collar similar to E, operating with the said angle-extension when provided with a screw-thread corresponding with that made with said screw-collar.

Having described my invention, what I claim, and desire to secure by Letters Patent, is—

1. The connecting-bush C, having tapering ends $a\ a'$ for entering the bore of the pipes to be connected, made solid with one another, and separated by the annular projection $b$, in combination with sleeves D and D', made with tapering bores $m\ m'$ for forming a lap-joint when said sleeves are drawn or pressed toward the annular projection $b$ of said connecting-bush, substantially as set forth.

2. A connecting-bush, C, provided with inclined ends $a\ a'$, having a solid connection with each other, and adapted to enter the bores of the pipes to be connected, sleeves D and D', provided with tapering bores adapted to embrace the ends of the pipe distended by the tapering surfaces $a\ a'$, and the inclined surfaces $c\ c'$ of the annular projection $b$, adapted to force the metal of the ends of the connecting-pipes into the beveled end edges $n\ n'$ of said sleeves when said sleeves are drawn toward each other, substantially as set forth.

Albany, N. Y., March 17, 1876.

HUGH GUYER.

Witnesses:
 ALEX. SELKIRK,
 GEO. A. THOMPSON.